Dec. 7, 1971  A. SCHOEPE ET AL  3,624,893
METHOD OF FINALLY ASSEMBLING BALL COCK GUIDE
AND FLOAT SUBASSEMBLY
Filed Feb. 19, 1970  4 Sheets-Sheet 1

INVENTORS.
ADOLF SCHOEPE,
FREDRIC E. SCHMUCK
BY MAHONEY, HORNBAKER
AND SCHICK
ATTORNEYS

Dec. 7, 1971  A. SCHOEPE ET AL  3,624,893
METHOD OF FINALLY ASSEMBLING BALL COCK GUIDE
AND FLOAT SUBASSEMBLY
Filed Feb. 19, 1970  4 Sheets-Sheet 3

INVENTORS.
ADOLF SCHOEPE,
FREDRIC E. SCHMUCK
BY
MAHONEY, HORNBAKER
AND SCHICK
ATTORNEYS

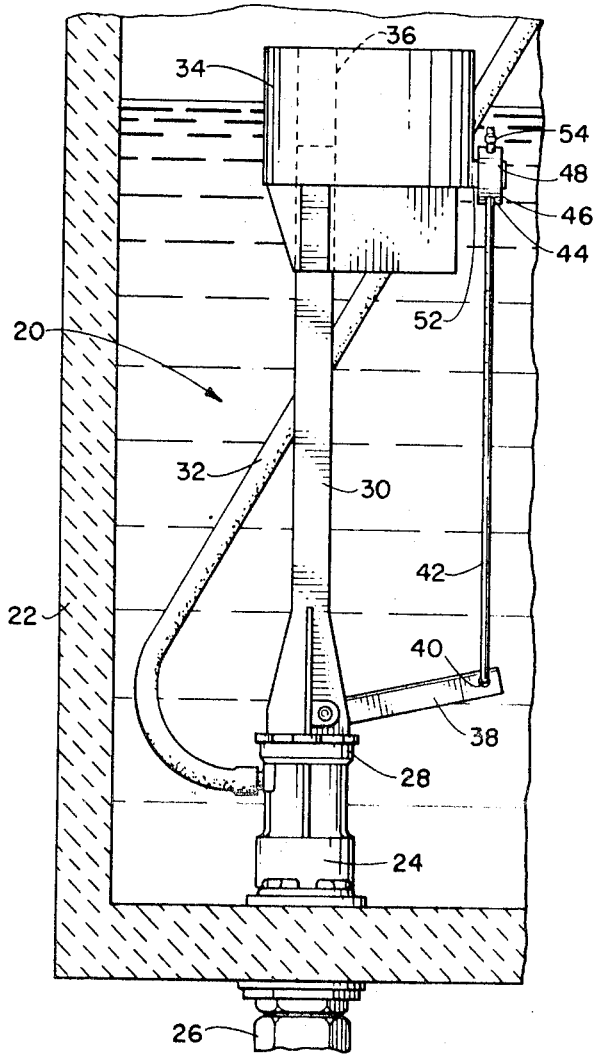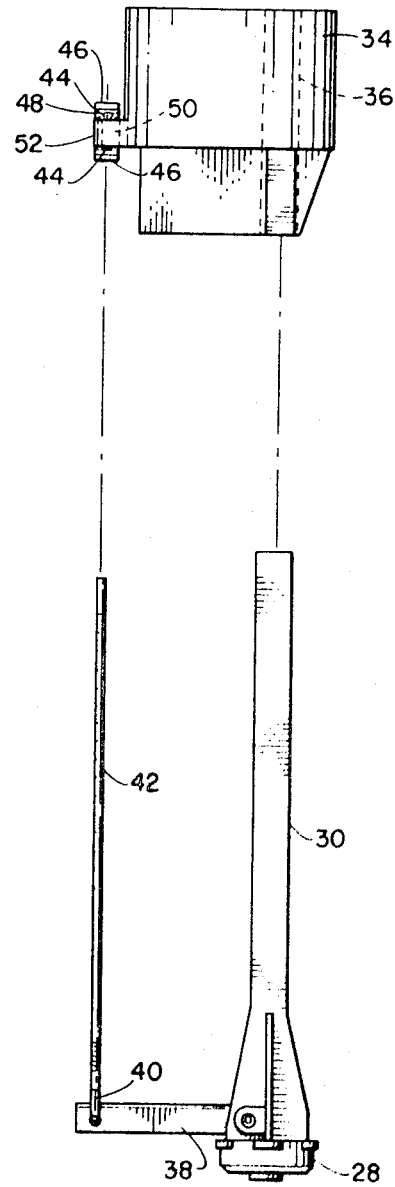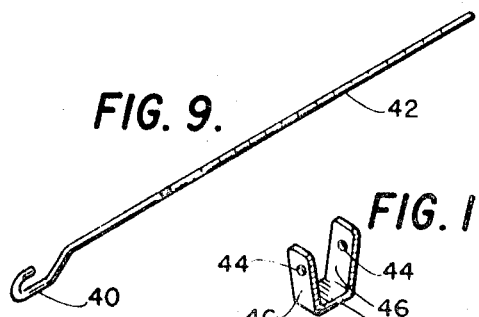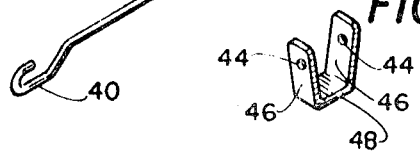

3,624,893
Patented Dec. 7, 1971

3,624,893
METHOD OF FINALLY ASSEMBLING BALL COCK GUIDE AND FLOAT SUBASSEMBLY
Adolf Schoepe, 1620 N. Raymond Ave., Fullerton, Calif. 92631, and Fredric E. Schmuck, 535 Century Drive, Anaheim, Calif. 92805
Filed Feb. 19, 1970, Ser. No. 12,783
Int. Cl. B23p 19/00; B23q 7/10
U.S. Cl. 29—429                                   20 Claims

ABSTRACT OF THE DISCLOSURE

A supply of ball cock floats are moved or fed consecutively by a vibrating supply bowl into a feed track and consecutively therealong to an assembly transfer station, with a supply of connecting clips being similarly moved or fed consecutively to a separated assembly transfer station, both the floats and connecting clips arriving and being retained at their respective transfer stations particularly positioned for following transfer operations. During a transfer operation preceding each assembly operation, a linearly movable float transfer arm engages each float at the transfer station and pushes that particular float to an assembly station float holder, while at the connecting clip transfer station a feed plunger moves a clip into a pivotal transfer arm mounted clip holder, the transfer arm subsequently pivotally moving the clip holder to its assembly station. In the respective assembly stations, the clip, U-shaped in configuration, has telescoped a float boss and is held aligning clip leg portion and float boss openings. An operator then simultaneously inserts a float end of a rigid guide through a guide opening of the float and a float end of a valve actuating link through the connecting clip and float boss aligned openings, a valve end of the guide being previously connected to a valve end of the actuating link through a valve control arm. Upon the float ends of the guide and valve actuating link simultaneously engaging limit switches, a staking punch stakes the float end of the valve actuating link beyond the connecting clip and float boss to permanently assemble the ball cock subassembly for removal from the assembly mechanism.

BACKGROUND OF THE INVENTION

This invention relates to methods of finally assembling ball cock guide and float subassemblies, and more particularly to methods for preferably automatically feeding or moving certain components of a ball cock guide and float final subassembly one at a time into final assembly stations held properly positioned interrelated for receiving a simple insertion of the remaining subassembly components therein and interengaged therewith, a final assembly stroke of the mechanism completing the subassembly. With the methods and procedures of the present invention, tedious ball cock component positioning operations previously all required to be performed singularly solely by hand by a human operator are combined into mechanism held and hand operations, and the operator is only required to perform simple component insertion operations, preferably a generally simultaneous dual component insertion, into previously positioned other components with the final subassembly operation then being completed by a simple reforming operation. As a result, all of the previously singularly hand-performed component positioning tasks are greatly simplified or eliminated and the quality of the resulting ball cock guide and float subassemblies is maintained at an optimum level.

Ball cocks of various types have long been used for the purpose of controlling the level of a liquid in a liquid storage tank wherein a valve of the ball cock serves as the inlet valve for the storage tank and a float on the ball cock maintains a liquid level within the storage tank between preset limits between or during uses of the tank storage liquid from an outlet of the storage tank. A prime example of the use of ball cocks is in the flush tanks of toilet installations. When the tank outlet is opened to cause the toilet flushing operation, the liquid level within the tank is immediately lowered as sensed by the ball cock float, thereby causing the float to actuate the ball cock valve and admit sufficient liquid through the tank inlet for once again raising the preset limit, likewise sensed by the float, to the normal intended liquid storage level and ready for the next toilet flushing operation.

In the form of ball cocks herein involved, a rigid guide or mast includes a float portion which is telescoped by a part of the float and serves to guide the float therealong during the varying liquid level controlling action. Furthermore, the rigid guide includes a valve portion having a pivotal valve control arm projecting therefrom and serving to open and close the valve to control the liquid flow through the storage tank inlet. A valve actuating link is pivotally connected near an outer end of the valve control arm and extends outwardly from but along the rigid guide to the float, being engaged with a connecting component such as a connecting clip.

Thus, movement of the float along the rigid guide will cause valve controlling movement of the valve control arm through the valve actuating link as retained secured to the float by the connecting component. For convenience in adjusting the liquid level in the tank being controlled by the ball cock within desired limits, many such ball cocks also include some form of adjustment between the float and valve actuating link through a particular construction and provision in the connecting component. Obviously, by an adjustment of the effective length of valve actuating link in its extension between the float and valve control arm, such liquid level adjustment can be obtained.

Although the overall constructions of these types of ball cocks are relatively simple, a multiplicity of ball cock components are involved and certain assembly operations require simultaneous positioning of various components, particularly during the final assembly thereof. Furthermore, without the aid of particular preplanned positioning and procedures, these final assembly operations can be quite tedious so as to require a maximum of worker concentration and making use of a relatively large amount of valuable labor time. Also, if these final assembly positioning and connecting operations are erroneously performed, either the quality of the final ball cock product will suffer or the finally assembled ball cock will not operate for its intended purpose and will require complete scrapping.

With the types of ball cocks herein involved, one of the more troublesome final assembly operations is the final assembly of the rigid guide, the float, the valve actuating link and the connecting component so as to result in the finally assembled ball cock operational in the manner hereinbefore described. Although this guide, float, valve actuating link and connecting component assembly operation is described herein as a subassembly operation, which it obviously is, at the time of this subassembly operation, the assembly of the various other components of the ball cock may or may not have been completed, depending on the particular type of ball cock involved and the types of components involved. Thus, where the term subassembly is used herein, such use is not intended to limit the principles of the present invention, but rather is for the purposes of directing the principles of the present invention to the guide, float, valve actuating link and connecting component assembly operations involved and it is not of consequence whether other required final assembly operations are performed before or after.

In the final assembly of the rigid guide, float, valve actuating link and connecting components, the assembly or connection of the valve actuating link to the valve control arm of the guide mounted valve is quite simple and may be accomplished merely by inserting a hook-shaped end of the valve actuating link through an opening at an end portion of the valve control arm. During this hook-shaped end opening connection, the valve actuating link may be freely pivotally manipulated since the float and connecting component are not yet involved. This initial valve actuating link and valve control arm connection may, therefore, be quickly and simply performed by hand or in any other manner desired providing the rigid guide and valve actuating link as a unitary element for the final assembly operations despite the remaining relatively free pivoting therebetween.

The real difficulty in the final assembly operation herein involved is the telescopic assembly of the float with the rigid guide, the proper relative positioning of the valve actuating link at the float with the connecting component properly positioned relative thereto and the maintenance of all of this simultaneous positioning during a reforming operation to finally complete and permanently secure the assembly in operational form. For instance, the rigid guide must be inserted into a previously formed opening in the float for the proper telescopic relationship therebetween and so that the float will be properly guided during movement along this rigid guide, while at the same time during the insertion of the rigid guide into or through the float, the portion of the valve actuating link to be connected to the float must be brought into proper relative positioning with the float and the connecting component completing such valve actuating link and float connection. Still at the same time, with the involvement of the connecting component in the connection between the valve actuating link and float, this connecting component must likewise be brought into proper relative position with the valve actuating link and the float so that the following and final reforming operation can take place and accomplish the final assembly.

In the particular example of ball cock illustrated herein, the rigid guide is received through an extended opening through the float and an end portion of the valve actuating link is received through aligned openings of the connecting component and a projecting boss of the float, the reforming operation being the staking of the valve actuating link beyond the connecting component and float boss after such assembly so as to prevent disassembly thereof. To further complicate the assembly procedure, the connecting component is in the form of a generally U-shaped connecting clip having the valve actuating link receiving openings in opposite leg portions thereof so that this connecting clip can be telescoped over the float boss with the opposite clip openings aligned with the float boss opening ready for insertion of the valve actuating link. Still further, in view of the particular construction and later operation of the various components of the ball cock, both the rigid guide and valve actuating link must be simultaneously inserted in their various assembled positions and retained simultaneously in these positions during the final reforming or staking operation.

It is obvious, therefore, that assembly purely by singular hand operations and wtihout assembly aiding procedures of ball cocks of this general type is extremely difficult. The float must be held properly positioned, the connecting component or connecting clip must be held properly positioned relative to the float boss and the rigid guide and now connected valve actuating link must be simultaneously inserted through their various aligned openings. It is for these reasons that a long-felt want and need has existed for the improved methods and procedures of the present invention.

OBJECTS AND SUMMARY OF THE INVENTION

It is, therefore, an object of this invention to provide methods and procedures for assembling ball cock guide and float subassemblies which eliminate at least certain of the prior tedious and time-consuming singular hand positioning and assembling operations, while insuring that the various components are positioned in proper relative relationships for a final proper assembly operation. According to the principles of the present invention, during a ball cock guide and float assembly operation, a float is held positioned in an exact and convenient orientation ready for reception of the rigid guide slidably therein and the valve actuating link now pivotally connected to the guide positioned therewith in final assembly relationship. Also, the connecting component, preferably a connecting clip, is held by the apparatus in proper relative relationship with both the float and valve actuating link, permitting accomplishment of the final reforming operation simply and easily on the preassembled ball cock elements to complete the final assembly.

It is further an object of the present invention to provide methods and procedures for assembling ball cock guide and float subassemblies which may adapt the described assembly operation to a quickly performed mass production operation compatible with a modern mass production manufacturing line. The floats may be fed from a source of supply, one at a time, consecutively into the assembly station and held at such assembly station properly positioned so as to be retained therein in proper assembly position. The connecting components may be likewise fed one at a time from a source of supply to a final assembly station and retained therein in proper assembly position relative to the float. Thus, for each consecutive ball cock assembly operation, it is only necessary for the operator to insert a previously assembled float and valve actuating link into final assembly positioning and complete the operation by carrying out the reforming operation.

It is also an object of this invention to provide methods and procedures for assembling ball cock guide and float subassemblies which effectively eliminates possibility of assembly error and insures an optimum quality of finally assembled product. As hereinbefore stated, with the methods and procedures of the present invention, a float is held properly positioned and a connecting component is held properly positioned both relative to each other and ready for insertion of the connected rigid guide and valve actuating link. The final reforming operation is carried out after both the rigid guide and valve actuating link are simultaneously placed in proper final assembly positions relative to the float and connecting component, at which time, the final reforming is carried out, thereby insuring proper final assembly of the ball cock elements involved.

Other objects and advantages of the invention will be apparent from the following specification and the accompanying drawings, which are for the purpose of illustration only.

BRIEF DESCRIPTION OF THE DRAWINGS

FIG. 7 is a side elevational view of one of the ball cocks after the guide and float subassembly has been carried out according to the methods and procedures of the present invention, said ball cock being illustrated in final total assembled form and installed in a typical installation within a flush tank of a toilet for controlling the water level therein, the flush tank being shown in vertical section for purposes of clarity;

FIG. 8 is an exploded view of the various ball cock elements ready for assembly according to the methods and procedures of the present invention, the ball cock float and connecting component or connecting clip being in finally assembled position and ready for insertion of the rigid guide and valve actuating link respectively therein;

FIG. 9 is a perspective view of the valve actuating link removed from connection with the rigid guide; and FIG. 10 is a perspective view of the connecting component or connecting clip.

DESCRIPTION OF THE BEST EMBODIMENT CONTEMPLATED

Figure 1:
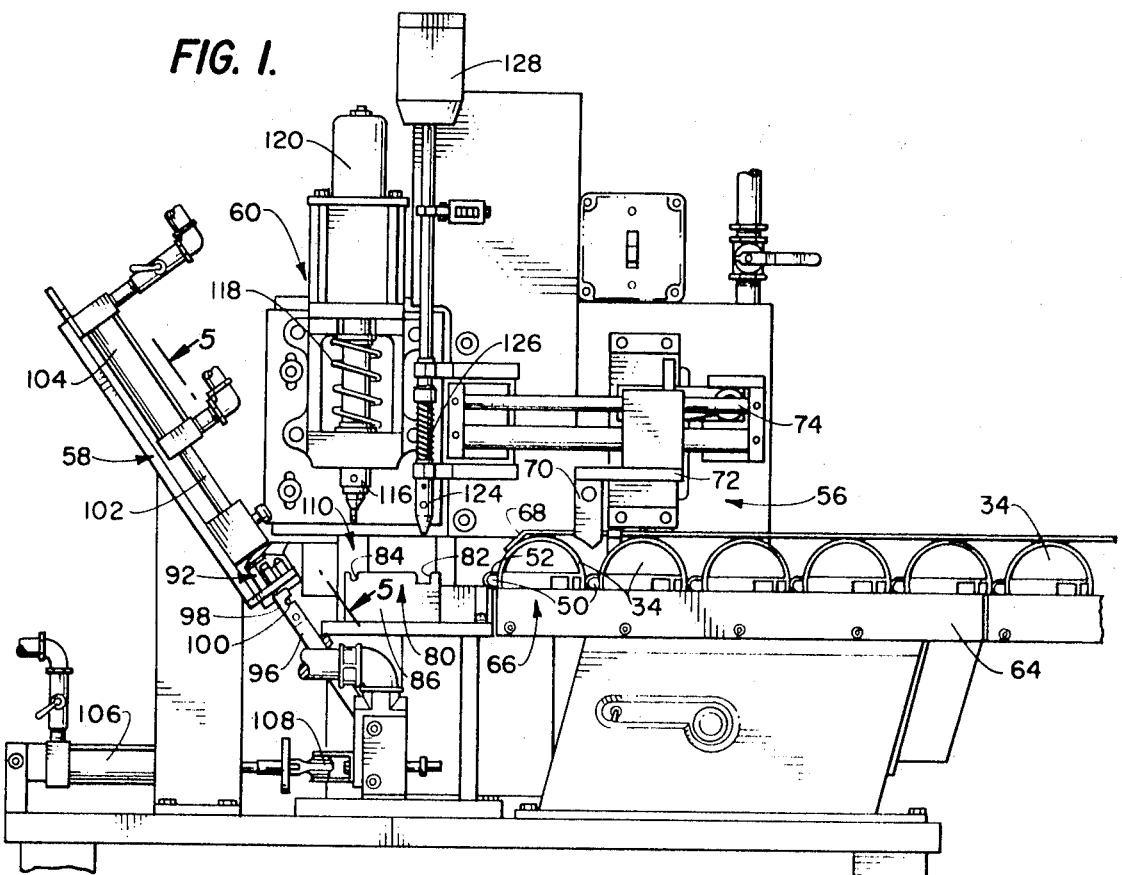
FIG. 1 is a fragmentary front elevational view of an embodiment of automatic assembly mechanism aiding in carrying out the methods and procedures of the present invention and showing a float feed portion of the mechanism ready for feeding a ball cock float to an assembly station, a connecting component feed portion of the mechanism ready for feeding a connecting component to an assembly station and a reforming portion of the mechanism ready for operation to complete the final assembly upon certain positioning conditions having been previously met.

An embodiment of automatic assembly mechanism for aiding in carrying out the methods and procedures of assembly of ball cock guide and float subassemblies of the present invention is illustrated in FIGS. 1 through 6 of the drawings and the particular ball cock incorporating the guide and float subassembly assembled by that particular embodiment of mechanism is illustrated in FIGS. 7 through 10 of the drawings. For purposes of clarity and ease of description, the overall ball cock construction in a typical installed environment will first be briefly described, then the particular subassembly involved with the embodiment of automatic assembly mechanism and the methods and procedures of the present invention, including certain necessary particulars of various elements thereof, and finally followed by a description of the embodiment of automatic assembly mechanism and its aid in carrying out the methods and procedures of the present invention.

Referring to FIG. 7, an overall ball cock assembly generally indicated at 20 is shown installed in a typical toilet flush tank 22 for controlling the inlet of water into such tank and thereby controlling the water level therein. The ball cock 20 includes a lower unit 24 secured to a tank water inlet 26, said lower unit terminating upwardly forming a lower portion of a water inlet valve 28, a separable upper portion of the valve being formed by lower extremities of a rigid upright guide or mast 30. The lower unit 24 also has a connected refill hose 32 serving the usual refill purposes of the toilet flush tank installation.

More important to the embodiment of automatic assembly mechanism and the assembly methods and procedures of the present invention, a ball cock guide and float subassembly portion of the ball cock 20 includes the previously pointed out rigid guide 30 which extends upwardly through a float 34, being received in a through guide opening 36 of the float. The subassembly also includes a valve control arm 38 pivotally mounted at the valve end or portion of the guide 30 which extends generally laterally outwardly from immediately above the valve 28 which it serves to control and terminates outwardly pivotally connected to a lower hook-shaped end 40 of a valve actuating link 42. The valve actuating link 42 of the subassembly extends upwardly generally parallel to the guide 30 and the link upper end passes through spaced, but aligned, openings 44 in spaced leg portions 46 of a generally U-shaped connecting clip or component 48, as well as an opening 50 through a laterally outwardly projecting boss 52 of the float 34.

As shown in FIG. 7 and indicated in FIG. 8, the connecting clip 48 in the ball cock guide and float subassembly herein involved is positioned with the leg portions 46 of said clip telescoping or one at each of the upper and lower sides of the float laterally projecting boss 52 so that in the assembly operation of this guide and float subassembly and with the lower hook-shaped end 40 of the valve actuating link 42 previously connected to the valve control arm 38, the rigid guide 30 and the valve actuating link 42 must be simultaneously inserted, the rigid guide being received through the float guide opening 36 simultaneously with the valve actuating link 42 being received through the aligned openings 44 of the clip leg portions 46 and the float boss opening 50. Thus, the subassembly final assembly operation is from the exploded positioning illustrated in FIG. 8 to the final assembled positioning shown in FIG. 7, and the particulars of the embodiment of the valve actuating link 42 and connecting clip 48 are shown in FIGS. 9 and 10 respectively. The final assembly operation of the subassembly is completed by a reforming operation, preferably by staking the assembled projecting upper end of the valve actuating link 42, that is, forming the stake 54 to laterally spread that portion of the valve actuating link and preventing the same from passing back downwardly through the upper of the openings 44 in the upper clip leg portion 46, the clip leg portions 46 through resiliency of the connecting clip 48 bearing outwardly to bear angularly against spaced adjustment recesses in the surface of the valve actuating link 42 for retaining desired length adjustment of the valve actuating link.

The embodiment of the automatic assembly mechanism for aiding in carrying out the assembly methods and procedures of the present invention is illustrated in FIGS. 1 through 6, certain views showing feeding, positioning and reforming operational steps for a clear understanding thereof. Referring for the moment to FIG. 1, the automatic assembly mechanism includes a float feeding and positioning portion generally indicated at 56, a connecting component or connecting clip feeding and positioning portion generally indicated at 58, and a reforming portion generally indicated at 60. In the particular embodiment of mechanism shown, the reforming portion 60 also includes apparatus for production marking of each of the ball cock guide and float subassemblies assembled, the particular function performed thereby being carried out at this stage of production for convenience, as will be hereinafter described more in detail.

Referring to FIGS. 1 through 4, the float feeding and positioning portion 56 of the assembly mechanism feeds the floats 34 consecutively one at a time from a vibrating float supply feed bowl 62 into a generally horizontal vibrating feed track 64, the feed bowl being of usual and well known construction for properly orienting each of the floats for exiting therefrom into the feed track with the float laterally projecting bosses 52 at the float leading side as shown. The float feed track 64 is likewise of usual construction and receives the floats in the consecutive positioning shown, moving the same progressively in their proper boss leading orientation to a transfer station generally indicated at 66. At the float transfer station 66, the leading of the floats 34 is retained by an overlying angular, resilient holding arm 68 and during this holding of the leading float at the float transfer station, the succeeding floats are, of course, retained in line ready for movement into such transfer station.

Figure 6:
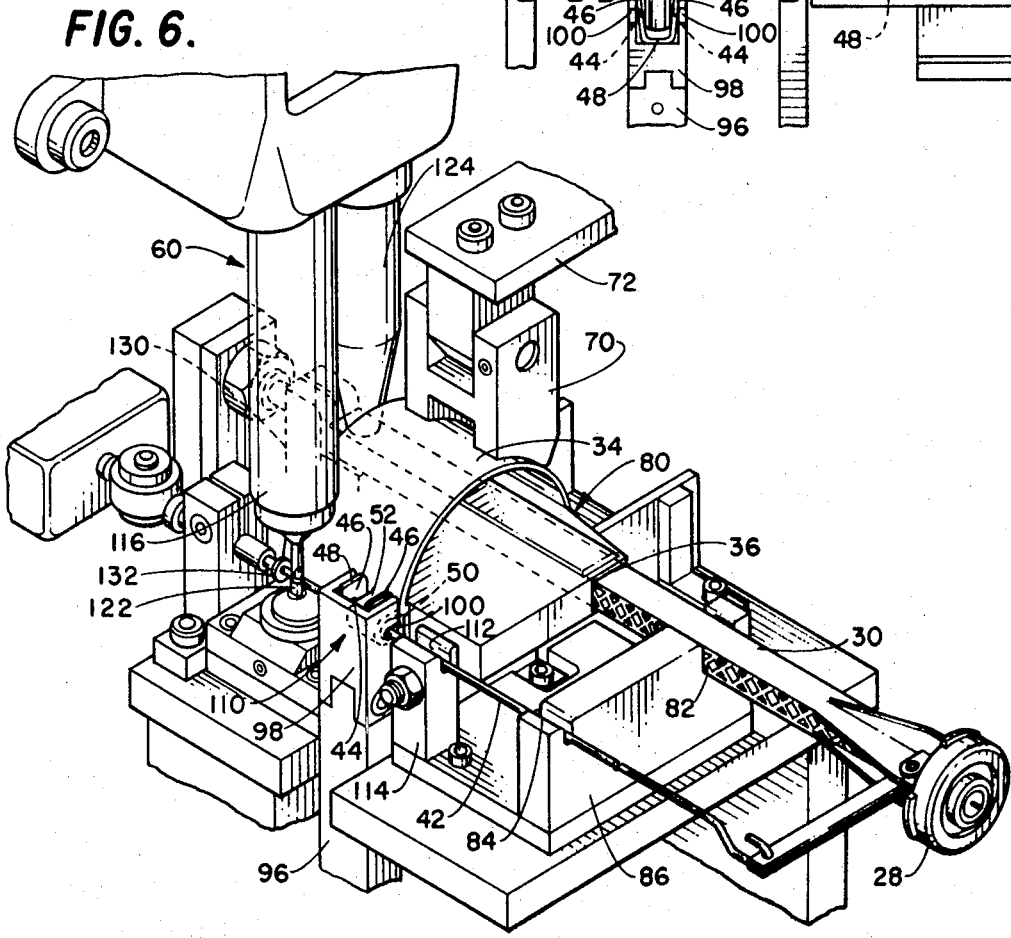
FIG. 6 is an enlarged, fragmentary perspective view with a portion of the mechanism removed and looking in the direction of the arrows 6—6 in FIG. 3 to more clearly illustrate the final reforming operation.

A float transfer arm 70 normally projecting downwardly into lateral interference with the leading float 34 at the float transfer station 66 is pivotally mounted in a particular manner on a laterally linearly movable carrier 72 slidably movable along the guide tracks 74. The lateral movement of the carrier 72 and consequently the float transfer arm 70 in lateral reciprocatory motion is controlled by a drive motor 76 through crank arms 78. As best seen in FIG. 6, the float transfer arm 70 is pivotally connected to the carrier 72 from the downward projecting position of such float transfer arm pivotal forwardly or away from the main extension of the float feed track 64 and the location of the float feed bowl 62, but not pivotal rearwardly toward the main extension of the float feed track beyond the downward projection of this float transfer arm or the downward projecting position shown in FIGS. 1 through 3 and 6.

Thus, during forward feeding or float transfer movement of the float transfer arm 70 in the forward direction away from the main extension of the float feed track 64, the float transfer arm presents a rigid downwardly projecting transfer arm, and during rearward return movement or movement in the direction of the main extension of the float feed track of the float transfer arm, the float transfer arm is free to pivot forwardly from its downwardly projecting position. Relative to a float 34 retained at the float transfer station 66 by the resilient float holding arm 68, the rearward movement of the float transfer arm 70 by the carrier 72 and its connection to the drive motor 76 is spaced rearwardly of that float at the float transfer station, but forwardly of the next float in line on the float feed track 64 which is the next float to be fed to the transfer station. The forward limit of movement of the float transfer arm 70 is shown, for instance, in FIG. 2, and is at a point abutting a slightly rearwardly directed arcuate surface of one of the floats 34 with that float in a float assembly station 80 spaced laterally forwardly of the float transfer station 66 and with the particular float having the guide opening 36 thereof and the boss opening 50 thereof respectively aligned horizontally with a guide alignment slot 82 and a link alignment slot 84 of an alignment plate 86 at the float assembly station.

Figure 2:
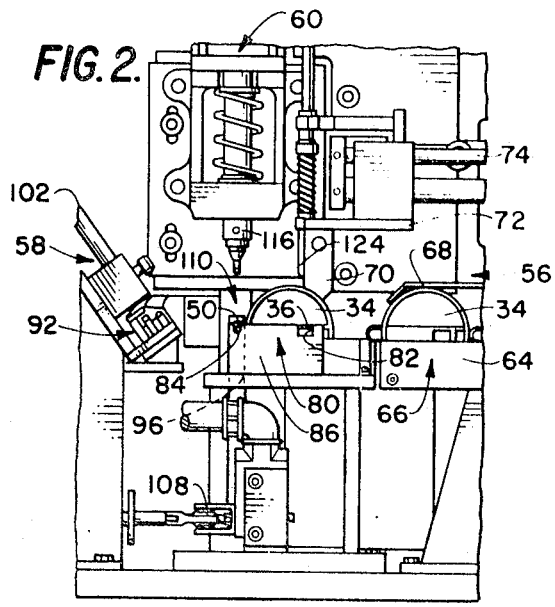
FIG. 2 is a fragmentary front elevational view taken from FIG. 1, but showing a more advanced operation of the mechanism wherein a ball cock float is being retained in its assembly station and a connecting component is being retained in its assembly station, both ready for assembly positioning of a previously connected rigid mast and valve actuating link.

Starting from the rearmost position of the float transfer arm 70, and at this time only considering the transfer arm movement reciprocally forwardly and rearwardly and the feed movement of one of the floats 34 from the float transfer station 66 forwardly to the float assembly station 80, the float transfer arm spaced rearwardly of the float at the float transfer station as shown in FIG. 1 moves forwardly to engage such float, and being rigid in this direction of movement, the float transfer arm in continued forward movement pushes the float at the float transfer station forwardly from beneath the resilient float holding arm 68 and on forwardly to the float assembly station into the position shown in FIG. 2. The float transfer arm 70 remains in this forwardmost position holding the particular float 34 at the float assembly station 80 until the assembly operation is complete, such assembly operation to be hereinafter described in detail, and then the float transfer arm begins rearward movement. During such rearward movement of the float transfer arm 70, it ultimately engages the next of the floats 34 now being held at the float transfer station 66 and since the float transfer arm is forwardly pivotal relative to the carrier 72, the float transfer arm pivots and slidably drags over the float at the float transfer station with the float transfer arm ultimately resuming its downwardly projecting position as shown in FIG. 1 when rearwardly clear of the float at the float transfer station so as to be ready for the next forward feeding movement.

Figure 5:
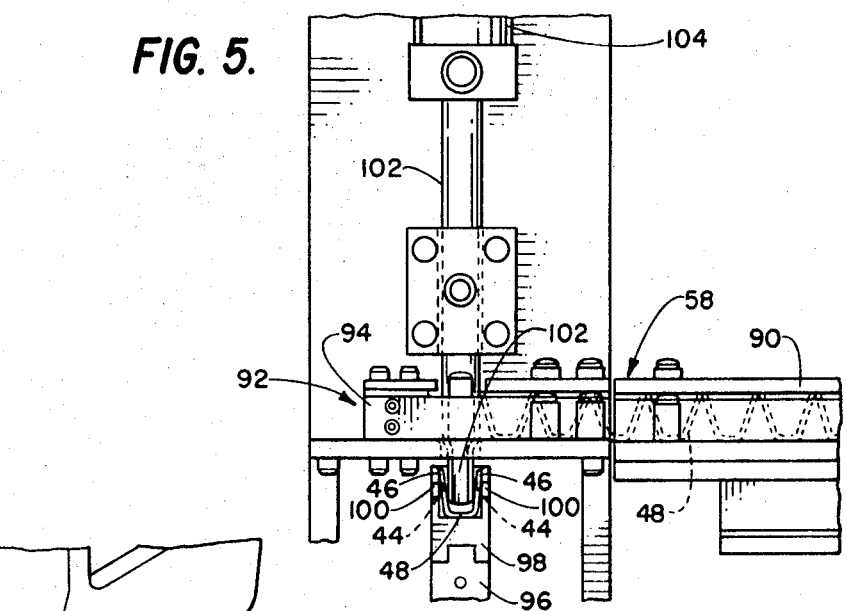
FIG. 5 is an enlarged, fragmentary sectional view looking in the direction of the arrows 5—5 in FIG. 1 and more clearly illustrating the connecting component feeding portion of the mechanism, in the particular embodiment illustrated, the feeding of generally U-shaped connecting clips.

The connecting clip feeding and positioning portion 58 feeds the connecting clips 48 consecutively one at a time from a vibrating, clip supply feed bowl 88 into a generally horizontal vibrating clip feed track 90, both of which are generally of the usual construction. More important to the principles of the present invention, as each of the connecting clips 48 leaves the clip feed bowl 88 it is properly oriented so as to be received in the clip feed track 90 with the clip generally U-shaped opening projecting angularly upwardly, that is, with the clip leg portions 46 terminating projecting angularly upwardly as best seen in FIG. 5. The connecting clips 48 are fed consecutively along the clip feed track 90 by the vibratory motion thereof with the leading of the connecting clips ultimately stopping at a clip transfer station generally indicated at 92 abutting a clip holding plate 94.

Figure 3:
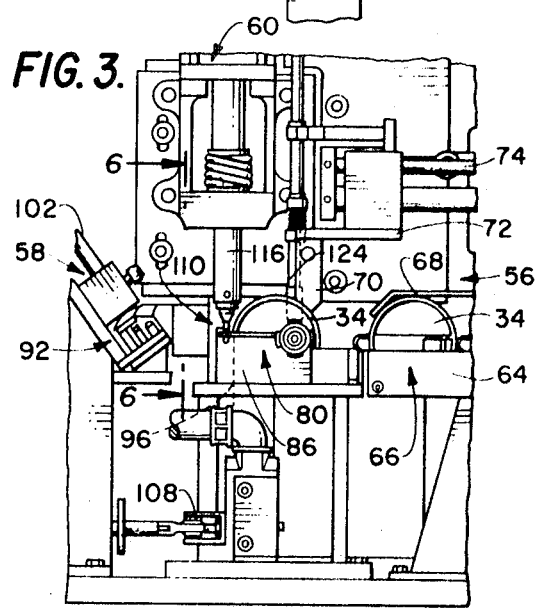
FIG. 3 is a view similar to FIG. 2, but showing the mechanism in a final assembly stage wherein all of the float, connecting component, rigid guide and valve actuating link have been properly assembled and the mechanism has been actuated and is carrying out the final reforming operation.
Figure 4:
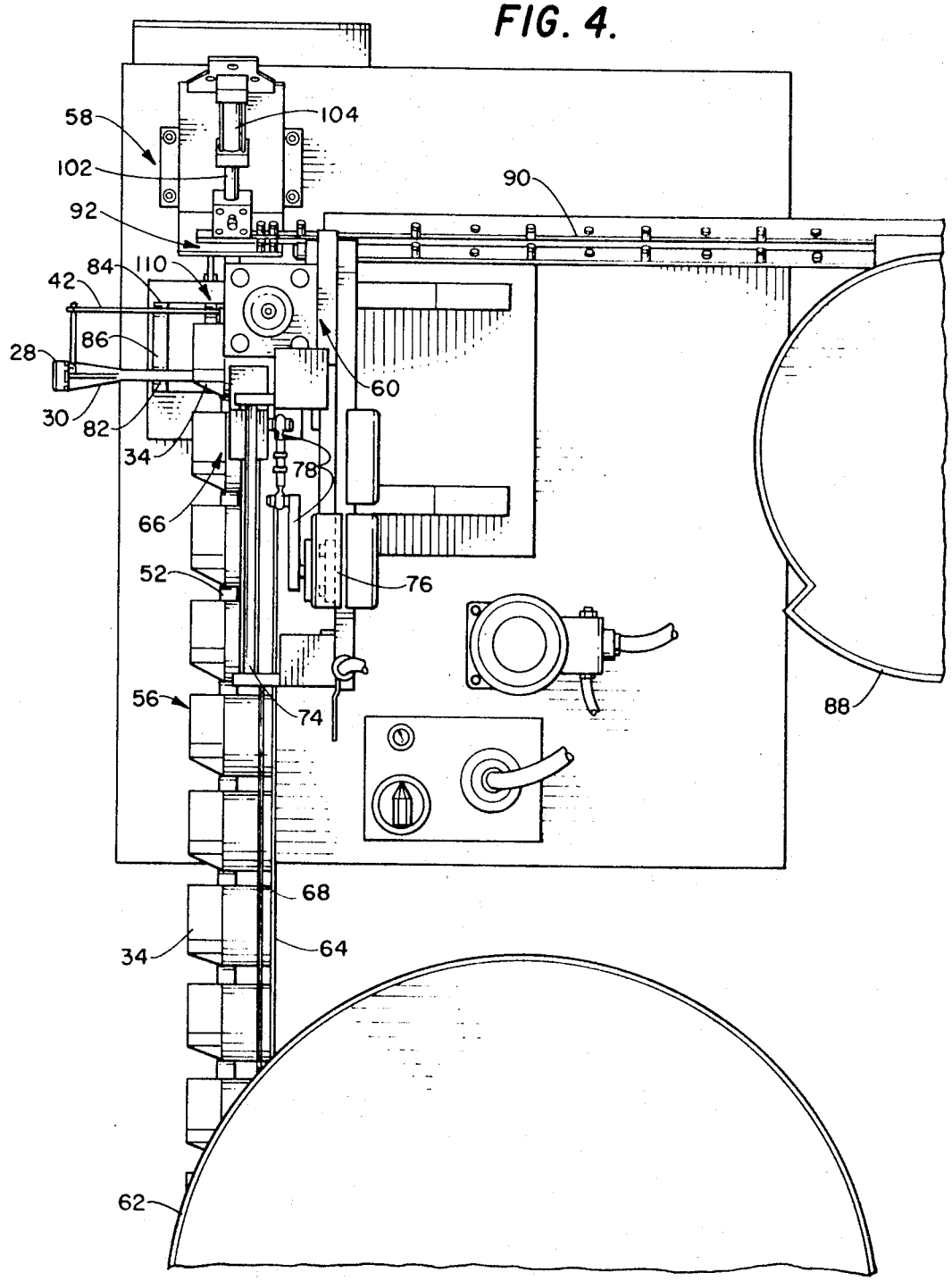
FIG. 4 is a fragmentary top plan view of the mechanism during the final reforming operation of FIG. 3.

Projecting angularly downwardly underlying the clip transfer station 92 and in the same angular orientation in a clip receiving position thereof, is a pivotal clip transfer arm 96 which is pivotal between this angular extension as shown in FIG. 1 about a lower end thereof to an inward clip assembling position extending vertically as shown in FIGS. 2 and 3. A clip holder 98 is secured to the upper end of the pivotal clip transfer arm 96 and the clip holder when in the angular clip receiving position of the clip transfer arm directly underlies and is downwardly aligned with the clip transfer station 92. Furthermore, with the clip holder 98 and the pivotal clip transfer arm 96 in the angular clip receiving position, the clip holder opens upwardly into the clip transfer station 92 permitting reception of a connecting clip 48 downwardly therein from the clip transfer station as will be hereinafter described, the clip holder also opening laterally toward the float assembly station 80 and having spaced and aligned link alignment slots 100 likewise opening toward the float assembly station, all as best seen in FIGS. 1 and 5.

An angularly positioned clip transfer plunger 102 normally overlies the clip transfer station 92 and is reciprocal downwardly through the rearwardly back above the clip transfer station by a fluid cylinder 104. When the fluid cylinder 104 is actuated to extend the clip transfer plunger 102 angularly downwardly through the clip transfer station 92, the clip transfer plunger engages the particular of the connecting clips 48 in the clip transfer station and moves such clip downwardly into the clip holder 98, that is, when the clip holder and pivotal clip transfer arm 96 are in the clip receiving position extending angularly beneath the clip transfer station in the manner shown in FIG. 5. It will be noted that as the particular of the connecting clips 48 is moved from the clip transfer station 92 into the clip holder 98 by the clip transfer plunger 102, the clip leg portions 46 are slightly resiliently depressed toward each other for a purpose to be hereinafter described and also that in the final positioning of the connecting clip in the clip holder, the openings 44 in the clip leg portions are aligned with the link alignment slots 100 of the clip holder, again for a purpose to be hereinafter described.

The pivotal transfer arm 96 and, therefore, the clip holder 98, are moved pivotally from angular projection in the clip receiving position downwardly aligned with the clip transfer station 92 into their vertically extending clip assembly position by a fluid cylinder 106 through control arms 108. In this clip assembly position of the pivotal clip transfer arm 96, the clip holder 98 and one of the connecting clips 48 retained therein are positioned at a clip assembly station generally indicated at 110 wherein the connecting clip in the clip holder is moved into telescoping position with the clip leg portions 46 at opposite sides of the boss 52 of a float 34 then retained in the float assembly station 80 as shown in FIG. 6. Also, with the clip holder 98 and its contained connecting clip 48 in the clip assembly station 110, all of the clip leg portion openings 44 and the float boss opening 50 are aligned with each other and aligned with the link alignment slot 100 of the clip holder 98 and the link alignment slot 84 of the alignment plate 86, as well as a link alignment slot 112 of a stationary alignment block 114 adjacent the clip holder 98 at the clip assembly station 110.

The reforming portion 60 of the automatic assembly mechanism is formed by a vertically reciprocal staking punch 116 best seen in FIGS. 1, 2, 3, and 6. As shown therein, the staking punch 116 is vertically reciprocal spaced inwardly of the clip assembly station 110 as viewed from the operator's side or front of the automatic assembly mechanism, that is, as viewed in the general direction of FIGS. 1, 2, 3 and 6. At the same time, the staking punch 116, in its vertical reciprocal movement, moves downwardly to a staking position inwardly aligned with the link alignment slot 84 of the alignment plate 86, the link alignment slot 112 of the alignment block 114, the link alignment slots 100 of the clip holder 98 as to the portions thereof inwardly aligned with the previously mentioned link alignment slots, and therefore the leg portion openings 44 of the connecting clip 48 and the float boss opening 50 when one of the connecting clip 48 and the floats 34 are in their respective clip assembly and float assembly stations 100 and 80.

As to operation, the staking punch 116 is preferably normally urged upwardly and retained upwardly primarily by a coil spring 118, and is urged downwardly to its staking position to perform a staking operation as will be hereinafter described by an electrically actuated solenoid 120. Again, as will be hereinafter more clearly described, in its downward movement and into its lower staking position, the staking punch 116 acts against a lower stationary staking die 122 as best seen in FIG. 6. Thus, the staking punch 116 is normally retained upwardly, but is selectively moved downwardly to its staking position at an appropriate time during the final securement operation of the ball cock guide float subassembly, all of which will be hereinafter described in proper sequence.

The reforming portion 60 of the automatic assembly mechanism may still further include a vertically reciprocal date stamp 124 which, similar to the staking punch 116, is normally urged upwardly by a coil spring 126 and selectively moved downwardly by an electrically actuated solenoid 128. The date stamp 124 in its downward stamping position is inwardly aligned with the guide alignment slot 82 of the alignment plate 86 and therefore the float guide opening 36 when one of the floats 34 is in the float assembly station 80, but inwardly of said float as best seen in FIG. 6. Thus, the date stamp 124 is operably similarly to the staking punch 116 and the particular operation of these elements and the timing thereof in the overall ball cock guide and float subassembly final assembly operation will be described in the description of the operation of the operation of the automatic assembly mechanism to immediately follow.

In operation of the automatic assembly mechanism for aiding in carrying out the method and procedural steps of the present invention, the floats 34 of the ball cock guide and subassemblies are moved or fed sequentially one at a time from the float feed bowl 62 and along the float feed track 64 with the leading float being held or retained positioned at the float transfer station 66 by the float holding arm 68 as shown in FIG. 1 and hereinbefore described, and the connecting components or connecting clips 48 are moved or fed sequentially one at a time from the clip feed bowl 88 along the clip feed track 90 with the leading connecting clip being held or retained in the clip transfer station 92 against the clip holding plate 94 as likewise hereinbefore described. Assume at this time as shown in FIG. 1, the float transfer arm 70 has been moved rearwardly by its carrier 72 and lies rearwardly spaced from the float 34 at the float transfer station 66, the pivotal clip transfer arm 96 is at its clip receiving position retaining the clip holder 98 thereon directly angularly underlying the clip transfer station 82 ready for the reception of a connecting clip 48 downwardly therein, and the staking punch 116 and the date stamp 124 are in their normal idle upward positions spaced upwardly of the float and clip transfer stations 66 and 92. These various elements of the automatic assembly mechanism may be placed in the positions of FIG. 1 in any usual and well-known manner of control, for instance, either through automatic actuation of the various elements as a result of the removal from the assembly mechanism of a previously finally assembled ball cock guide and float subassembly or through selective operation of portions of the assembly mechanism by an operator, so that specific description thereof is not necessary.

Continuing the sequence of operation and the carrying out of the method and procedural steps, the drive motor 76 for the carrier 72 of the float transfer arm 70 is actuated, moving the float transfer arm 70 forwardly, engaging behind the float 34 at the float transfer station 66, and moving said float into the float assembly station 80, retaining the same therein as shown in FIG. 2. Also, the fluid cylinder 104 of the clip transfer plunger 102 is actuated to move the clip transfer plunger downwardly engaging into the connecting clip 48 at the clip transfer station 92 and moving said connecting clip downwardly into the clip holder 98 while depressing the clip leg portions 46 inwardly as previously described and as shown in FIG. 5. The foregoing transfer of the connecting clip 48 into the clip holder 98 is then followed by actuation of the fluid cylinder 106 which, through the control arms 108, pivots the pivotal clip transfer arm 96 and the clip holder 98 to the clip assembly station 110 as also shown in FIG. 2, the connecting clip 48 telescoping over the boss 52 of the float 34 in the float assembly station 80 aligning the leg portion openings 44 of the connecting clip with the float boss opening 50.

The particular float 34 and connecting clip 48 are, therefore, now in assembled position ready for the reception of the guide 30 and valve actuating link 42, as shown in FIG. 2 in the automatic assembly mechanism and as shown in FIG. 8 removed from said mechanism. A previously connected guide 30 and valve actuating link 42 as shown in FIG. 8 is then picked up by the operator with the guide being inwardly inserted slidably through the guide opening 36 of the float 34 simultaneously with the inwardly inserting of the valve actuating link 42 inwardly through the aligned leg portion openings 44 of the connecting clip 48 and the float boss opening 50 into the position shown in FIGS. 3, 4 and 6, all while the float 34 is held in the float assembly station 80 by the float transfer arm 70 and the connecting clip 48 is held in the assembly station 110 by the clip holder 98. The connection of the guide 30 and the valve actuating link 42 into the form shown in FIG. 8 has been previously described and is simply accomplished by hand or otherwise merely by a proper pivotal movement of the valve actuating link to engage the lower hook-shaped end 40 of said link with the valve control arm 38 in an obvious manner.

As best seen in FIG. 6, it is preferred to provide the automatic assembly mechanism with the necessary control so that when the rigid guide 30 is inserted through the float guide opening 36 and the valve actuating link 42 is simultaneously inserted through the connecting clip 48 and the float boss 52, the rigid guide and the valve actuating link after passage inwardly through their respective openings in the subassembly will engage inwardly against switch controls which when simultaneously engaged will actuate operation of the staking punch 116 and the date stamp 124. The rigid guide 30, therefore, upon insertion through the float 34, will engage a guide actuated control switch 130 and the valve actuating link 42 when inserted through the connecting clip 48 and the float boss 52 will engage a link actuated control switch 132. When the guide actuated and link actuated control switches 130 and 132 are simultaneously engaged, actuation of the staking punch 116 and the date stamp 124 preferably automatically takes place since the simultaneous engagement of these control switches will assure that the various ball cock components are in position for the staking punch and date stamp operations.

Actuation of the staking punch 116 through actuation of the solenoid 120 moves the staking punch 116 downwardly to engage the protruding end of the valve actuating link 42 forming the stake 54 in said valve actuating link and against the staking die 122. Formation of the stake 54 in the protruding end of the valve actuating link 42 flattens out that portion of the valve actuating link by distorting the same so that the portion of the valve actuating link containing the stake cannot pass through the various leg portion openings 44 of the connecting clip 48 and the float boss opening 50, assuring retainment of assembly of this ball cock guide and float subassembly. At the same time, actuating of the date stamp 124 through actuation of the solenoid 128 moves the date stamp downwardly against the protruding end of the rigid guide 30 forming on said guide a preset production date, number or any other appropriate information desired for later identification of the particular ball cock guide and float subassembly now being finally assembled, or the date on which it was finally assembled.

Upon completion of the downward actuation of the staking punch 116 and the date stamp 124, these elements return to their raised positions as shown in FIG. 1, while also preferably automatic controls return the float transfer arm 70 to its position shown in FIG. 1 rearward of the next float 34 now at the float transfer station 66 and the pivotal clip transfer arm 96 and clip holder 98 to downward angular alignment with the clip transfer station 92 as shown in FIG. 1 ready for the transfer of the next connecting clip 48 now at the transfer station. As also previously described, as the float transfer arm 70 is moved rearwardly to the position described, ready for the forward engagement with the next float 34, it pivots freely forwardly to pass or slide over the float now in the float transfer station.

The finally assembled ball cock guide and float subassembly may then be removed by slight upwardly lifting and withdrawal from the automatic assembly mechanism. Thus, the mechanism is ready for the start of the next transfer operations of the next float 34 and connecting clip 48. The sequence of operation for the next final assembly operation and the method and procedural steps for carrying out the same is, of course, merely a repeat of that described.

It will be noted that as the finally assembled ball cock guide and float subassemblies are removed from the automatic assembly mechanism at the completion of the final stages of such final assembly, that is, the forming of the stake 54 and the various markings by the date stamp 124, the particular connecting clip 48 of the particular subassembly is removed from the clip holder 98 so that this clip holder no longer holds the leg portions 46 of this connecting clip depressed. The resiliency of the particular connecting clip 48 will therefore return these connecting clip leg portions 46 slightly outwardly against the valve actuating link 42, tightly gripping this valve actuating link at these spaced locations so that the adjustment between the valve actuating link and the connecting clip is retained. This adjustment, of course, can be altered merely by hand-depressing or moving toward one another of the leg portions 46 of the particular connecting clip 48 with the valve actuating link 42 during such depressing being freely slidable through the connecting clip, all a part of the particular construction of the ball cock 20 used for illustration herein.

According to the principles of the present invention, therefore, methods and procedures for assembling ball cock guide and float subassemblies are provided within virtually all of the formerly tedious hand-positioning steps of the ball cock float 34 and the connecting clip 48 assembly are eliminated, such ball cock elements being uniquely held in assembled interrelated positions ready for the quick insertion of a previously simply connected rigid guide 30 and valve actuating link 42. Furthermore, according to the method and procedural steps, the floats 34 and the connecting clips 48 may be moved or fed into these finally assembled positions one at a time on a mass production operation basis and held or retained therein so that it is virtually impossible to mis-assemble the inserted rigid guide 30 and valve actuating link 42, thereby eliminating final subassemblies which are not properly assembled and could create scrap parts. Still at the same time, according to certain method and procedural steps of the present invention, the final stages of the final assembly operation preferably cannot take place with the automatic assembly mechanism until both the rigid guide 30 and valve actuating link 42 are in proper assembly with the float 34 and connecting clip 48, still further assuring that properly assembled ball cock guide and float subassemblies will be produced.

We claim:

1. In a method of assembling ball cocks and the like, said ball cocks each being of the type comprising a float movably telescoping a float portion of a rigid guide and a valve portion of said guide having a valve control arm projecting therefrom, with a valve actuating link projecting from said valve control arm and being connected to said float; the steps of: positioning a float with a float guide opening and a valve actuating link connection portion of said float simultaneously exposed, preassembling a guide having a valve control arm with a valve actuating link in generally finally assembled connection; inserting said guide of said guide and link preassembly into said float guide opening after said float positioning into generally finally assembled relative positioning telescoped by said float; generally simultaneously with said guide insertion, placing said valve actuating link of said guide and link preassembly into generally finally assembled relative positioning with said valve actuating link connection portion of said float; and performing a working operation after said generally simultaneous guide insertion and valve actuating link placing to permanently retain at least said float and said guide and link preassembly in generally finally assembled form.

2. In a method of assembling ball cocks and the like as defined in claim 1, in which said ball cock includes a connecting component at said valve actuating link connecting portion of said float at least aiding in retaining said float and said guide and link preassembly in generally finally assembled form; in which said method includes the step of prior to said inserting of said guide and said generally simultaneous placing of said valve actuating link, positioning said connecting component in generally finally assembled position relative to said valve actuating link connection portion of said float; in which said step of generally simultaneously placing said valve actuating link includes the placing of said valve actuating link of said guide and link preassembly into generally finally assembled relative positioning with said valve actuating link connection portion of said float and said connecting component; and in which said step of performing said working operation includes the performing of said working operation after said generally simultaneous guide insertion and valve actuating link placing to permanently retain at least said float and said guide and link preassembly and said connecting component in said generally finally assembled form.

3. In a method of assembling ball cocks and the like as defined in claim 1, in which said ball cocks include a connecting component at said valve actuating link connection portion of said float at least aiding in retaining said float and said guide and link preassembly in generally finally assembled form; in which said method includes the step of prior to said inserting of said guide into said float and said generally simultaneous placing of said valve actuating link, positioning said connecting component into generally finally assembled positioning relative to said valve actuating link connection portion of said float; in which said step of generally simultaneously placing said valve actuating link includes the generally simultaneously inserting of said valve actuating link of said guide and link preassembly through openings of said valve actuating link connection portion of said float and said connecting component thereby placing said valve actuating link and said float and said connecting component into generally finally assembled relative positioning; and in which said step of performing said working operation includes the performing of said working operation after said generally simultaneous guide and valve actuating link insertions to permanently retain at least said float and said guide and link preassembly and said connecting component in generally finally assembled form.

4. In a method of assembling ball cocks and the like as defined in claim 1, in which said ball cocks include a connecting clip at said valve actuating link connection portion of said float at least aiding in retaining said float and said guide and link preassembly in generally finally assembled form; in which said method includes the step of prior to said insertion of said guide into said float and said generally simultaneous placing of said valve actuating link, positioning said connecting clip telescoping a part of said valve actuating link connection portion of said float, placing said connecting clip and said valve actuating link connection portion of said float in a generally finally assembled relative positioning; in which said step of generally simultaneously placing said valve actuating link includes the placing of said valve actuating link of said guide and link preassembly into generally finally assembled relative positioning with said valve actuating link connection portion of said float and said connecting clip; and in which said step of performing a working operation includes the performing of a working operation after said generally simultaneous guide insertion and valve actuating link placing to permanently retain at least said float and said guide and link preassembly and said connecting clip in generally finally assembled form.

5. In a method of assembling ball cocks and the like as defined in claim 1, in which said ball cocks include said valve actuating link connection portion of said float being a boss projecting from said float and a connecting clip at said float boss at least aiding in retaining said float and said guide and link preassembly in generally finally assembled form; in which said method includes the step of prior to said inserting of said guide into said float and said generally simultaneous placing of said valve actuating link, positioning said connecting clip at least partially telescoping said float boss into a generally finally assembled relative positioning; in which said step of generally simultaneously placing said valve actuating link includes the generally simultaneously placing of said valve actuating link of said guide and link preassembly into generally finally assemled relative positioning with said float boss and said connecting clip; and in which said step of performing said working operation includes the performing of said working operation after said generally simultaneous guide insertion and valve actuating link placing to permanently retain at least said float and said guide and link preassembly and said connecting clip in generally finally assembled form.

6. In a method of assembling ball cocks and the like as defined in claim 1, in which said ball cocks include said valve actuating link connection portion of said float being a float boss and a generally U-shaped connecting clip having spaced leg portions, said connecting clip being at said float boss at least aiding in retaining said float and said guide and link preassembly in generally finally assembled form; in which said method includes prior to said inserting of said guide into said float and said generally simultaneous placing of said valve actuating link, positioning said connecting clip with said connecting clip spaced leg portions at opposite sides of said float boss and said connecting clip at least partially telescoping said float boss in a generally finally assembled relative positioning; in which said step of generally simultaneously placing said valve actuating link includes the inserting of said valve actuating link of said guide and link preassembly through aligned openings of said connecting clip spaced leg portions and said float boss placing said valve actuating link and said connecting clip and said float boss into generally finally assembled relative positioning; and in which said step of performing a working operation includes the performing of a working operation after said generally simultaneous guide and valve actuating link insertions to permanently retain at least said float and said guide and link preassembly and said connecting clip in generally finally assembled form.

7. In a method of assembling ball cocks and the like as defined in claim 1, in which said ball cock includes a connecting component at said valve actuating link connection portion of said float at least aiding in retaining said float and said guide and link preassembly in generally finally assembled form; in which said method includes the step of prior to said inserting of said guide into said float and said generally simultaneous placing of said valve actuating link, positioning said connecting component into generally finally assembled positioning relative to said valve actuating link connection portion of said float; in which said step of generally simultaneously placing said valve actuating link includes the generally simultaneously inserting of an end of said valve actuating link of said guide and link preassembly through openings of said valve actuating link connection portion of said float and said connecting component thereby placing said valve actuating link and said float and said connecting component into generally finally assembled relative positioning; and in which said step of performing said working operation includes the staking of said valve actuating link end beyond said valve actuating link connecting portion of said float and said connecting component after said generally simultaneous guide and valve actuating link end insertions to permanently retain at least said float and said guide and link preassembly and said connecting component in generally finally assembled form.

8. In a method of assembling ball cocks and the like as defined in claim 1, in which said ball cocks include said valve actuating link connection portion of said float being a float boss and a generally U-shaped connecting clip having spaced leg portions, said connecting clip being at said float boss at least aiding in retaining said float and said guide and link preassembly in generally finally assembled form; in which said method includes prior to said inserting of said guide into said float and said generally simultaneous placing of said valve actuating link, positioning said connecting clip with said connecting clip spaced leg portions at opposite sides of said float boss and said connecting clip at least partially telescoping said float boss in a generally finally assembled relative positioning; in which said step of generally simultaneously placing said valve actuating link includes the insertion of an end of said valve actuating link of said guide and link preassembly through aligned openings of said connecting clip spaced leg portions and said float boss placing said valve actuating link and said connecting clip and said float boss into generally finally assembled relative positioning; and in which said step of performing a working operation includes the staking of said valve actuating link end beyond said connecting clip and float boss after said generally simultaneous guide and valve actuating link end insertions to permanently retain at least said float and said guide and link preassembly and said connecting clip in generally finally assembled form.

9. In a method of assembling ball cocks and the like as defined in claim 1, in which said step of positioning said float includes the first positioning of said float at a transfer station, and then moving said float to an assembly station and positioning said float at said assembly station with said float guide opening and said valve actuating link connection portion of said float simultaneously exposed.

10. In a method of assembling ball cocks and the like as defined in claim 1, in which said step of positioning said float includes the first positioning of said float in a transfer station with said float guide opening and said valve actuating link connection portion of said float in predetermined positions, and then moving said float to an assembly station and positioning said float in said assembly station with said float guide opening and said valve actuating link connecting portion of said float maintained in said predetermined positions, said float guide opening and said valve actuating link connection portion of said float in said predetermined positions being simultaneously exposed when said float is in said assembly station.

11. In a method of assembling ball cocks and the like as defined in claim 1, in which said ball cock includes a connecting component at said valve actuating link connection portion of said float at least aiding in retaining said float and said guide and link preassembly in generally finally assembled form; in which said method includes the step of prior to said inserting of said guide and said generally simultaneous placing of said valve actuating link, first positioning said connecting component at a transfer station, then moving said connecting component from said transfer station to an assembly station and positioning said connecting component at said assembly station in generally finally assembled position relative to said valve actuating link connection portion of said float; in which said step of generally simultaneously placing said valve actauting link includes the placing of said valve actuating link of said guide and link preassembly into generally finally assembled relative positioning with said valve actuating link connection portion of said float and said connecting component; and in which said step of performing said working operation includes the performing of said working operation after said generally simultaneous guide insertion and valve actuating link placing to permanently retain at least said float and said guide and link preassembly and said connecting component in said generally assembled form.

12. In a method of assembling ball cocks and the like as defined in claim 1, in which said ball cock includes a connecting component at said valve actuating link connection portion of said float at least aiding in retaining said float and said guide and link preassembly in generally finally assembled form; in which said step of positioning said float includes the first positioning of said float at a transfer station, and then moving said float to an assembly station and positioning said float at said assembly with said float guide openings and said valve actuating link connection portion of said float simultaneously exposed; in which said method includes the step of prior to said inserting of said guide and said generally simultaneous placing of said valve actuating link, first positioning said connecting component at a transfer station, then moving said connecting component from said transfer station to an assembly station and positioning said connecting component at said assembly station in generally finally assembled position relative to said valve actuating link connection portion of said float; in which said step of generally simultaneously placing said valve actuating link includes the placing of said valve actuating link of said guide and link preassembly into generally finally assembled relative positioning with said valve actuating link connection portion of said float and said connecting component; and in which said step of performing said working operation includes the performing of said working operation after said generally simultaneous guide insertion and valve actuating link placing to permanently retain at least said float and said guide and link preassembly and said connecting component in said generally assembled form.

13. In a method of assembling ball cocks and the like as defined in claim 1, in which said ball cocks include said valve actuating link connection portion of said float being a float boss and a generally U-shaped connecting clip having spaced leg portions, said connecting clip being at said float boss at least aiding in retaining said float and said guide and link preassembly in generally finally assembled form; in which said step of positioning said float includes the first positioning of said float at a transfer station, and then moving said float to an assembly station and positioning said float at said assembly station with said float guide opening and said float boss simultaneously exposed; in which said method includes the step of prior to said inserting of said guide and said generally simultaneous placing of said valve actuating link, first positioning said connecting clip at a transfer station, then moving said connecting clip from said transfer station to an assembly station and positioning said connecting clip at said assembly station with said connecting clip spaced leg portions at opposite sides of said float boss and said connecting clip at least partially telescoping said float boss in a generally finally assembled relative positioning; in which said step of generally simultaneously placing said valve actuating link includes the insertion of an end of said valve actuating link of said guide and link preassembly through aligned openings of said connecting clip spaced leg portions and said float boss placing said valve actuating link and said connecting clip and said float boss into generally finally assembled relative positioning; and in which said step of performing a working operation includes the staking of said valve actuating link end beyond said connecting clip and float boss after said generally simultaneous guide and valve actuating link end insertions to permanently retain at least said float and said guide and link preassembly and said connecting clip in generally finally assembled form.

14. In a method of assembling ball cocks and the like, said ball cocks each being of the type comprising a float movably telescoping a float portion of a rigid guide and a valve portion of said guide having a valve control arm projecting therefrom, with a valve actuating link projecting from said valve control arm and being connected through at least the aid of a connecting component to said float; the steps of: positioning a float with a float guide opening and a valve actuating link connection portion of said float simultaneously exposed; positioning a connecting component at said valve actuating link connection portion of said float and into generally finally assembled relative positioning; inserting a guide into said float guide opening after said float positioning into generally finally assembled relative positioning telescoped by said float; generally simultaneously with said guide insertion, placing a valve actuating link into generally finally assembled relative positioning with said valve actuating link connection portion of said float and said connecting component; and performing a working operation after said generally simultaneous guide insertion and valve actuating link placing to permanently retain at least said float, said guide, said valve actuating link and said connecting component in generally finally assembled form.

15. In a method of assembling ball cocks and the like as defined in claim 14, in which said step of generally simultaneously placing said valve actuating link includes the generally simultaneous insertion of said valve actuating link through aligned openings of said valve actuating link connection portion of said float and said connecting component into generally finally assembled relative positioning of said valve actuating link, said valve actuating link connection portion of said float and said connecting component.

16. In a method of assembling ball cocks and the like as defined in claim 14, in which said valve actuating link connection portion of said float is a boss projecting from said float and said connecting component is a generally U-shaped connecting clip having spaced leg portions; in which said step of positioning and connecting component includes the positioning of said connecting clip at least partially telescoped with said float boss, said connecting clip leg portions being positioned at opposite sides of said float boss and openings through said connecting clip leg portions and said float boss being aligned in generally finally assembled positions; and in which said step of generally simultaneously placing said valve actuating link includes the generally simultaneous insertion of said valve actuating link through said connecting clip leg portion and float boss aligned openings into said finally assembled relative positioning.

17. In a method of assembling ball cocks and the like as defined in claim 14, in which said step of positioning said float includes the first positioning of said float at a transfer station, and then moving said float to an assembly station and positioning said float with said float guide opening and said valve actuating link connection portion of said float simultaneously exposed; and in which said step of positioning said connecting component includes the first positioning said connecting component at a transfer station, and then moving said connecting component to an assembly station and positioning said connecting component in said generally finally assembled positioning relative to said valve actuating link connection portion of said float.

18. In a method of assembling ball cocks and the like as defined in claim 14, in which said step of positioning said float includes the first moving of said float into a transfer station, then moving said float to an assembly station and positioning said float with said float guide opening and said valve actuating link connection portion of said float simultaneously exposed, and moving a next-to-be-assembled float into said float transfer station during said float movement to and positioning in said float assembly station; and in which said step of positioning said connecting component includes the first moving of said connecting component into a transfer station, then moving said connecting component into an assembly station and positioning said connecting component in said generally finally assembled position relative to said valve actuating link connection portion of said float, and moving a next-to-be-assembled connecting component into said connecting component transfer station during said connecting component movement into and positioning at said connecting component assembly station.

19. In a method of assembling ball cocks and the like as defined in claim 14 in which said step of positioning said float includes the first positioning of said float at a transfer station in a particular positional orientation relative to an assembly station, and then moving said float to said assembly station and positioning said float in said assembly station in a particular positional orientation in which said float guide opening and said valve actuating link connection portion of said float are simultaneously exposed; in which said step of positioning said connecting component includes the first positioning said connecting component at a transfer station in a particular positional orientation relative to an assembly station, and then moving said connecting component to said assembly station and positioning said connecting component at said assembly station in a particular positional orientation in which said connecting component is in generally finally assembled positioning relative to said valve actuating link connection portion of said float; and in which said step of generally simultaneously placing said valve actuating link includes the generally simultaneous insertion of said valve actuating link through aligned openings of said valve actuating link connection portion of said float and said connecting component into generally finally assembled relative positioning of said valve actuating link, said valve actuating link connection portion of said float and said connecting component.

20. In a method of assembling ball cocks and the like as defined in claim 14, in which said valve actuating link connection portion of said float is a boss projecting from said float and said connecting component is a generally U-shaped connecting clip having spaced leg portions; in which said step of positioning said float includes the first moving of said float into a transfer station and maintaining said float in said transfer station in a particular positional orientation relative to an assembly station, then moving said float to said assembly station and positioning said float in said assembly station with said float in a particular positional orientation in which said float guide opening and said float guide boss are simultaneously exposed, and moving a next-to-be-assembled float into said float transfer station into said particular positional orientation relative to said assembly station during said float movement to and positioning in said float assembly station; in which said step of positioning said connecting component includes the first moving of said connecting clip into a transfer station and maintaining said connecting clip in said transfer station in a particular positional orientation relative to an assembly station, then moving said connecting clip into said assembly station and positioning said connecting clip in said assembly station at least partially telescoped with said float boss, said connecting clip leg portions being positioned at opposite sides of said float boss and openings through said connecting clip leg portions and said float boss being aligned in generally finally assembled positions, and moving a next-to-be-assembled connecting clip into said connecting clip transfer station maintained in said particular positional orientation relative to said connecting clip assembly station during said connecting clip movement into and positioning at said connecting clip assembly station.

References Cited

UNITED STATES PATENTS

| 2,904,877 | 9/1959 | Edelen | 29—157.1 |
| 2,986,809 | 6/1961 | Focht | 29—211 |

THOMAS H. EAGER, Primary Examiner

U.S. Cl. X.R.

29—157.1, 211 D